(12) United States Patent
Shinkawa et al.

(10) Patent No.: US 8,259,116 B2
(45) Date of Patent: Sep. 4, 2012

(54) IMAGE CREATING DEVICE, IMAGE CREATING METHOD, INFORMATION RECORDING MEDIUM, AND PROGRAM

(75) Inventors: Yoji Shinkawa, Tokyo (JP); Takahiro Omori, Tokyo (JP); Shuyo Murata, Tokyo (JP); Hiroaki Yoshiike, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 991 days.

(21) Appl. No.: 12/293,527

(22) PCT Filed: Mar. 22, 2007

(86) PCT No.: PCT/JP2007/055797
§ 371 (c)(1),
(2), (4) Date: Sep. 18, 2008

(87) PCT Pub. No.: WO2007/122951
PCT Pub. Date: Nov. 1, 2007

(65) Prior Publication Data
US 2009/0278850 A1      Nov. 12, 2009

(30) Foreign Application Priority Data
Mar. 23, 2006   (JP) .................................. 2006-080401

(51) Int. Cl.
*G06T 13/00*   (2011.01)
(52) U.S. Cl. ........... 345/473; 345/419; 345/440; 463/32
(58) Field of Classification Search .................... None
See application file for complete search history.

(56) References Cited

U.S. PATENT DOCUMENTS

| | | | |
|---|---|---|---|
| 6,246,422 B1 * | 6/2001 | Emberling et al. | 345/552 |
| 2001/0029202 A1 | 10/2001 | Kondo et al. | |
| 2002/0150941 A1 * | 10/2002 | Gojobori et al. | 435/6 |

(Continued)

FOREIGN PATENT DOCUMENTS

| | | |
|---|---|---|
| JP | 2000176156 A | 6/2000 |
| JP | 2000-339494 | 12/2000 |
| JP | 2001-0091156 | 1/2001 |
| JP | 2005-131310 | 5/2005 |
| WO | WO 03/090887 A1 | 11/2003 |

OTHER PUBLICATIONS

Internaational Search Report dated May 1, 2007 PCT/JP2007/055797.

(Continued)

*Primary Examiner* — Ulka Chauhan
*Assistant Examiner* — Phong Nguyen
(74) *Attorney, Agent, or Firm* — Howard & Howard Attorneys PLLC

(57) ABSTRACT

In an image creating device (201) for creating an image viewably showing the distribution of an environment parameter of the environment around a character in a virtual space, a parameter acquiring unit (202) acquires an environment parameter of the environment around a character in each direction from the character, a reference curve setting unit (203) sets a reference curve surrounding the character, a trajectory point setting unit (204) sets a trajectory point in a position moved in a predetermined direction from each reference point in the reference curve by an amount of move associated with the value of the environment parameter at the reference point acquired in the direction from the character toward the reference point, and an image creating unit (205) creates an image showing the trajectory curve passing through the set trajectory points and the character viewed from the point of view placed in the virtual space.

14 Claims, 8 Drawing Sheets

U.S. PATENT DOCUMENTS

2002/0165028 A1   11/2002  Miyamoto et al.
2003/0040362 A1*  2/2003  Egashira ........................ 463/42
2006/0238498 A1*  10/2006  Kando et al. .................. 345/156
2008/0234844 A1*  9/2008  Boustead et al. ............... 700/94

OTHER PUBLICATIONS

European Search Report EP07739240 mailed Apr. 3, 2009, 6 pages.

* cited by examiner

IMAGE CREATING DEVICE, IMAGE CREATING METHOD, INFORMATION RECORDING MEDIUM, AND PROGRAM

TECHNICAL FIELD

The present invention relates to an image creating device and image creating method suitable for creating an image viewably showing the distribution of an environment parameter of the environment around a character in a virtual space, a computer readable information recording medium storing a program for realizing these on a computer, and the program.

BACKGROUND ART

Conventionally, various types of techniques for presenting various parameters to a player in a game have been proposed. Such a technique has been disclosed in, for example, Patent Literature 1.

Patent Literature 1 International Publication No. WO03/090887

Here, in Patent Literature 1, there has been disclosed a technique for detecting an environment parameter, converting the environment parameter to a consumption-type parameter, storing the amount of the converted consumption-type parameter in memory, and displaying the amount on a display. Additionally, techniques such as displaying an arrow in the direction of an enemy character or in the direction of an item for clearing a mission of the game are also widely employed.

DISCLOSURE OF THE INVENTION

Problem to be Solved by the Invention

Nevertheless, there has been a great demand for presentation of the distribution of and change in an environment parameter of the environment around the character to the player in an easy-to-understand manner.

The present invention has been made to overcome such problems, and it is an object of the present invention to provide an image creating device and image creating method suitable for creating an image viewably showing the distribution of an environment parameter of the environment around a character in a virtual space, a computer readable information recording medium storing a program for realizing these on a computer, and the program.

Means for Solving the Problem

To achieve the above objective, the following will be disclosed according to the principles of the present invention.

An image creating device according to a first aspect of the present invention comprises a parameter acquiring unit, a reference curve setting unit, a trajectory point setting unit, and an image creating unit, and is constituted as follows.

That is, the parameter acquiring unit acquires an environment parameter of the environment around a character placed in a virtual space, in each direction from the character.

The simplest environment parameter is the location of an enemy character or target item, where the numeric value of the environment parameter of the location where the enemy character or target item exists is increased. In such a case, as the direction from the character nears the direction in which the enemy character or target item exists, the numeric value of the environment parameter of that direction increases.

Various parameters can be adopted as the environment parameter, such as the direction in which another character exists, the volume of sound produced in that direction, the amount of heat radiated from a heat source or the temperature difference, the slope or elevation difference of the ground, the ground resistance when walking, or the stress level, physical strength, attack power, or defensive power of another character.

On the other hand, the reference curve setting unit sets a predetermined curve (hereinafter "reference curve") that surrounds the character.

Typically, a circle circumference parallel to the horizontal plane of the virtual world or ground with the character at its center is employed as the reference curve. Additionally, the angle formed with the line of sight may be set to a certain value so that the view from the point of view always appears at an angle. Further, as described later, even more information can be presented to the user using the center position of the circle and the circle size.

The trajectory point setting unit sets a point (hereinafter "trajectory point") in a position moved in a predetermined direction from each point (hereinafter "reference point") in the set reference curve by an amount of move associated with the value of the environment parameter at the reference point acquired in the direction from the character toward the reference point.

In the above-described example, it is typical to set the direction perpendicular to the circle as the predetermined direction and employ the product of a predetermined constant and the value of the environment parameter as the amount of move. The amount of space between reference points is typically an amount that breaks the reference curve at equal distances, and the reference points may be finely distributed in the direction in which the environment parameter rapidly changes, and roughly distributed in other directions.

On the other hand, the image creating unit creates an image showing a curve (hereinafter "trajectory curve") passing through the set trajectory points and the character viewed from the point of view placed in the virtual space.

When the trajectory curve is drawn, neighboring trajectory points corresponding to neighboring reference points may be simply connected with line segments, or a curve may be smoothly drawn using a technique such as spline interpolation. At this time, the curve connecting the trajectory points within the virtual space may be created and then displayed using three-dimensional graphics, or the coordinates of the trajectory points may be converted to two-dimensional coordinates within the image by three-dimensional graphic processing and the curve connecting these coordinates may be obtained by interpolation.

According to the present invention, an environment parameter of the environment around a character in focus is graphically displayed in three dimensions in the environment around the character by a trajectory curve, thereby enabling the user to easily grasp the distribution of or change in the environment parameter of the environment around the character.

Further, the image creating device of the present invention may be configured so that the parameter acquiring unit further acquires an environment parameter of the position of the character, and the reference curve setting unit sets the size of the reference curve to a size associated with the value of the acquired environment parameter of the position of the character.

In a game in which a character takes on another character (the other character being another player or the computer), the state of the other character can be observed according to the above invention, but it is often desirable to identify how the player's own character looks from the other character.

Here, typically an environment parameter of the position where the character exists (i.e., information corresponding to how the player's own character looks from the other character) is obtained using the same technique as that when obtaining an environment parameter of the environment around the character.

Then, the size of the reference curve is determined by that environment parameter. In the above example, for example, a technique such as using the product of an environment parameter of the current position of the player's own character and a predetermined constant as the radius of the circle circumference can be employed.

According to the present invention, it is possible to present to the user an environment parameter of the current position of a character by means of a graph prepared by the above-described invention without preparing a new meter or graph, thereby enabling the user to easily grasp the environment parameter of the current position of the character.

Further, in the image creating device of the present invention, the reference curve setting unit may be configured so that the position of the reference curve with respect to the character can be changed to a position associated with the speed and direction of movement of the character.

For example, even when the player's own character turns to the right or left of a character set behind that character, in a game viewed from a point of view (generally, the character is not necessarily always behind the player's own character, but a certain amount of inertia is provided to prevent three-dimensional graphic wooziness), when the character itself moves, generally the speed of the character itself is expressed by the movement of the background of the character and, as a technique for presenting that speed itself to the user, a speedometer is separately provided.

On the other hand, in the present invention, various information is presented by placing the graph employed in the above invention in the environment around the character, and the speed and direction of movement of the character itself are expressed by shifting the position of the graph with respect to the character.

Typically, the reference curve is shifted in proportion to the movement speed or movement acceleration in the direction opposite that in which the character is moving, thereby narrowing the amount of space between the character and reference curve in the direction of character movement.

According to the present invention, it is possible for the player to simply grasp an environment parameter of the environment around a character, and to simply grasp the movement speed and movement direction of the player itself.

Further, the image creating device of the present invention may be configured so that the reference curve is a circle and the predetermined direction has a normal component with respect to the plane in which the circle is included.

The present invention is according to the preferred embodiments of the above-described invention and, as described above, adopts a circle (circle circumference) as the reference curve. In the above example, the direction orthogonal to the plane that includes the circle is set as the "predetermined direction," resulting in conditions where the graph is drawn on the side surface of a column.

Additionally, the predetermined direction having a normal component may conceivably be, for each reference point, the direction that proceeds to the reference point from a convergence point established on a perpendicular line drawing from the center of the circle, or a direction resulting from further shifting of the position of the convergence point. This is equivalent to conditions where the graph is drawn on the side surface of a circular cone.

Further, the direction formed when the convergence point is moved to a point at infinity is a form of "setting a direction orthogonal to the plane that includes the circle as the predetermined direction", as described above. Additionally, a technique that sets the direction in which the angle formed with the line of sight is constant as the "predetermined direction" is also possible.

The present invention is according to the preferred embodiments of the invention described above, making it possible to appropriately configure the location in which the trajectory point is placed and viewably present an environment parameter of the environment around the character to the user.

An image creating method according to another aspect of the present invention is executed on an image creating device comprising the parameter acquiring unit, reference curve setting unit, trajectory point setting unit, and image creating unit, and includes a parameter acquiring step, a reference curve setting step, a trajectory point setting step, and an image creating step, which are configured as follows.

Here, in the parameter acquiring step, the parameter acquiring unit acquires an environment parameter of the environment around a character placed in a virtual space, in each direction from the character.

On the other hand, in the reference curve setting step, the reference curve setting unit sets a predetermined curve (hereinafter "reference curve") that surrounds the character.

Furthermore, in the trajectory point setting step, the trajectory point setting unit sets a point (hereinafter "trajectory point") in a position moved in a predetermined direction from each point (hereinafter "reference point") in the set reference curve by an amount of move associated with the value of the environment parameter at the reference point acquired in the direction from the character toward the reference point.

Then, in the image creating step, the image creating unit creates an image showing a curve (hereinafter "trajectory curve") passing through the set trajectory points and the character, the curve and the character being as viewed from the point of view placed in the virtual space.

A program according to another aspect of the present invention is constituted so as to cause a computer to function as the image creating device described above, and to execute the image creating method described above on the computer.

The program of the present invention can be recorded on a computer readable information recording medium, such as a compact disk, a flexible disk, a hard disk, a magneto-optical disk, a digital video disk, a magnetic tape, or a semiconductor memory.

The above program can be distributed and sold, independently of a computer which executes the program, over a computer communication network. The information recording medium can be distributed and sold independently of the computer.

Effect of the Invention

According to the present invention, it is possible to provide an image creating device and image creating method suitable for creating an image viewably showing the distribution of an environment parameter of the environment around a character in a virtual space, a computer readable information recording medium storing a program for realizing these on a computer, and the program.

Figure 1:
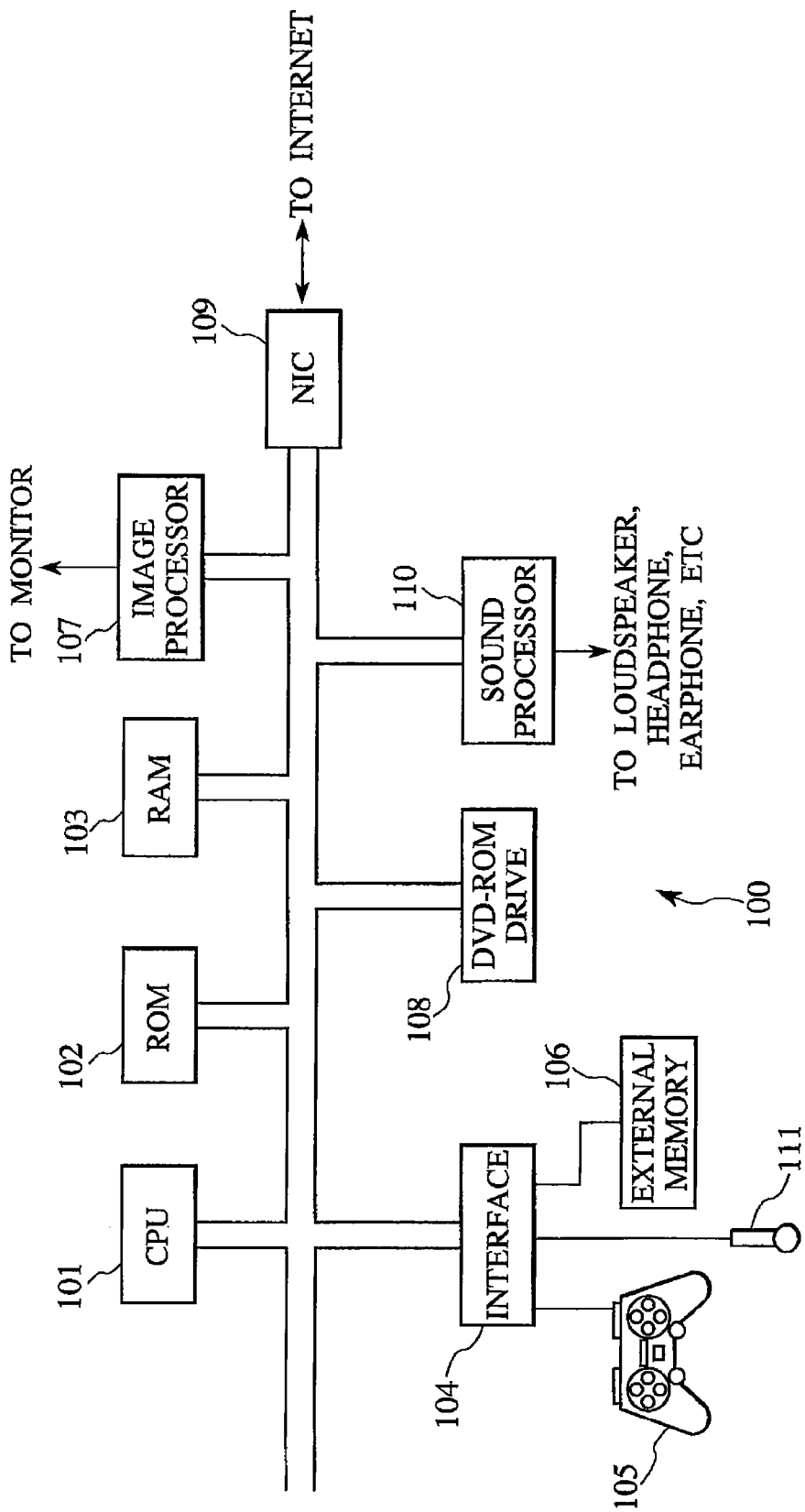
FIG. 1 is a schematic diagram illustrating the schematic configuration of a typical information processing device that carries out the function of an image creating device of the embodiment by executing a program.

DESCRIPTION OF REFERENCE NUMERALS 100 information processing device
101 CPU
102 ROM
103 RAM
104 interface
105 controller
106 external memory
107 image processor
108 DVD-ROM drive
109 NIC
110 sound processor
111 mic
201 image creating device
202 parameter acquiring unit
203 reference curve setting unit
204 trajectory point setting unit
205 image creating unit
301 ground of virtual world
302 grid
401 character
403 circle circumference
404 reference point
405 direction of axis x
406 direction of half line toward reference point
407 trajectory point
408 trajectory curve
501 screen
701 convergence point

BEST MODE FOR CARRYING OUT THE INVENTION

An embodiment of the present invention will be described below. The embodiment to be described below is given by way of illustration only, and not to limit the scope of the invention. Therefore, persons skilled in the art can employ embodiments in which the individual elements or all the elements are replaced with equivalent ones, and which are also encompassed in the scope of the invention.

Embodiment 1

FIG. 1 is a schematic diagram illustrating the schematic configuration of a typical information processing device that carries out the function of an image creating device of the present invention by executing a program. A description is given below with reference to this drawing.

An information processing device 100 comprises a CPU (Central Processing Unit) 101, a ROM 102, a RAM (Random Access Memory) 103, an interface 104, a controller 105, an external memory 106, an image processor 107, a DVD-ROM (Digital Versatile Disc ROM) drive 108, an NIC (Network Interface Card) 109, a sound processor 110, and a mic 111.

As a DVD-ROM storing a program and data for a game is loaded into the DVD-ROM drive 108 and the information processing device 100 is powered on, the program is executed to realize the image creating device of this embodiment.

The CPU 101 controls the general operation of the information processing device 100, and is connected to individual components to exchange a control signal and data therewith. Further, by using an ALU (Arithmetic Logic Unit) (not shown), the CPU 101 can perform arithmetic operations such as addition, subtraction, multiplication, division, etc., logical operations such as logical addition, logical multiplication, logical negotiation, etc., bit operations such as bit addition, bit multiplication, bit inversion, bit shift, bit rotation, etc., on a storage area, or a register (not shown) which can be accessed at a high speed. Furthermore, the CPU 101 itself may be designed to be able to rapidly perform saturate operations such as addition, subtraction, multiplication, division, etc., for handling multimedia processes, vector operations such as trigonometric function, etc., or may realize these with a coprocessor.

An IPL (Initial Program Loader) which is executed immediately after power-on is recorded in the ROM 102. As the IPL is executed, the program recorded in the DVD-ROM is read into the RAM 103 and is executed by the CPU 101. Further, the RAM 102 stores a program and various data for an operating system necessary for controlling the overall operation of the information processing device 100.

The RAM 103 is for temporarily storing data and programs, and retains the program and data read from the DVD-ROM, and other data needed for progressing a game and chat communication. Further, the CPU 101 performs processes such as securing a variable area in the RAM 103 to work the ALU directly upon the value stored in the variable to perform operations, or once storing the value stored in the RAM 103 in the register, performing operations on the register, and writing back the operation result to the memory, etc.

The controller 105 connected via the interface 104 receives an operation input which is made when a user executes the game.

The external memory 106 detachably connected via the interface 104 rewritably stores data indicating the play status (past performance, etc.) of a game, etc., data indicating the progress status of the game, data of chat communication logs (records) in the case of a network match-up game, etc. As the user makes an instruction input via the controller 105, these data can adequately be recorded in the external memory 106.

The program for realizing the game and the image data and sound data accompanying the game are recorded in the DVD-ROM to be loaded into the DVD-ROM drive 108. Under the control of the CPU 101, the DVD-ROM drive 108 performs a process of reading from the DVD-ROM loaded therein to read a necessary program and data, and these are temporarily stored in the RAM 103 or the like.

The image processor 107 processes data read from the DVD-ROM by means of the CPU 101 and an image operation processor (not shown) the image processor 107 has, and then records the data in a frame memory (not shown) in the image processor 107. The image information recorded in the frame memory is converted to a video signal at a predetermined synchronous timing, which is in turn output to a monitor (not shown) connected to the image processor 107. Image displays of various types are therefore possible.

The image operation processor can enable high-speed execution of an overlay operation of a two-dimensional image, a transparent operation like a blending, and various kinds of saturate operations.

It is also possible to enable high-speed execution of an operation of rendering polygon information which is arranged in virtual three-dimensional space and to which various kinds of texture information are added, by a Z buffer scheme to acquire a rendered image with a downward view of a polygon toward a predetermined direction of line of sight, arranged in the virtual three-dimensional space, from the predetermined view point position.

Further, the CPU 101 and the image operation processor cooperate to be able to write a string of characters as a two-dimensional image in the frame memory or on each polygon surface according to font information which defines the shapes of characters.

The NIC 109 serves to connect the information processing device 100 to a computer communication network (not shown), such as the Internet or the like. Such the NIC 109 is pursuant to the 10 BASE-T/100 BASE-T standard which is used at the time of constructing a LAN (Local Area Network) for example, or it is comprised of such an analog modem for connecting to the Internet using a telephone circuit, an ISDN (Integrated Services Digital Network) modem, an ADSL (Asymmetric Digital Subscriber Line) modem, a cable model for connecting to the Internet using a cable television circuit, or the like, and of an interface (not shown) which intervenes between the CPU 101 and any one of such modems.

The sound processor 110 converts sound data read from the DVD-ROM to an analog sound signal, and outputs the analog sound signal from a speaker (not shown) connected thereto. Under the control of the CPU 101, the sound processor 110 generates sound effects and music data to be generated during progress of the game, and outputs sounds corresponding thereto from a speaker.

In a case where the sound data recorded on the DVD-ROM is MIDI data, the sound processor 110 refers to the sound source data included in the data, and converts the MIDI data to PCM data. Further, in a case where the sound data is compressed sound data of ADPCM format or Ogg Vorbis format, etc., the sound processor 110 uncompresses the data, converting it to PCM data. The PCM data is D/A (Digital/Analog) converted at a timing corresponding to the sampling frequency of the data and output to the speaker, thereby enabling sound output.

Further, the information processing device 100 can be connected to the mic 111 via the interface 104. In this case, A/D conversion is performed on the analog signal from the mic 111 at an appropriate sampling frequency, thus making it possible to perform mixing, etc., with the sound processor 110 using a PCM format digital signal.

In addition, the information processing device 100 may be configured to achieve the same functions as the ROM 102, the RAM 103, the external memory 106, and the DVD-ROM which is to be loaded into the DVD-ROM drive 108 or the like by using a large-capacity external storage device, such as a hard disk.

The information processing device 100 discussed above is equivalent to a so-called "consumer-oriented television game device," but anything which performs sound processing or image processing can realize the present invention. Accordingly, the present invention can be realized on a variety of computational machines, such as portable telephones, portable game devices, karaoke apparatuses, common business computers, and so on.

For example, the ordinary computer, like the image processing device 100, has a CPU, RAM, ROM, DVD-ROM drive, NIC, sound input mic, and sound output speaker, has an image processor having simpler functions than the information processing device 100, and can use a flexible disk, magneto-optical disk, a magnetic tape or the like in addition to a hard disk as an external storage device. The keyboard, mouse or the like, not the controller 105, is used as an input device.

Figure 2:
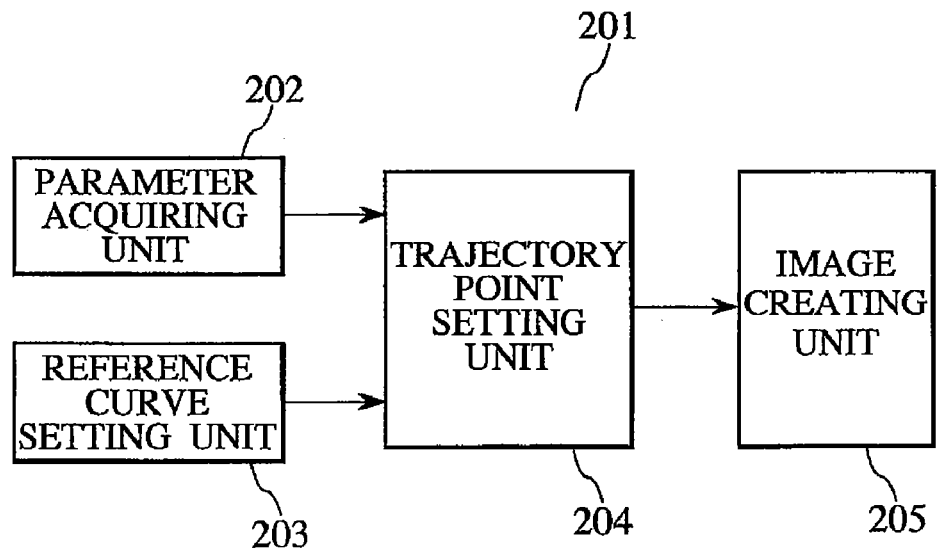
FIG. 2 is a schematic diagram illustrating the schematic configuration of an image creating device according to the embodiment.

FIG. 2 is a schematic diagram illustrating the schematic configuration of an image creating device according to one embodiment of the present invention. A description is given below with reference to this drawing.

An image creating device 201 of this embodiment comprises a parameter acquiring unit 202, a reference curve setting unit 203, a trajectory point setting unit 204, and an image creating unit 205.

That is, the parameter acquiring unit 202 acquires an environment parameter of the environment around a character placed in a virtual space, in each direction from the character.

The simplest environment parameter is the location of an enemy character or target item, where the numeric value of the environment parameter of the location where the enemy character or target item exists is increased. In such a case, as the direction from the character nears the direction in which the enemy character or target item exists, the numeric value of the environment parameter of that direction increases.

Various parameters can be adopted as the environment parameter, such as the direction in which another character exists, the volume of sound produced in that direction, the amount of heat radiated from a heat source or the temperature difference, the slope or elevation difference of the ground, the ground resistance when walking, or the stress level, physical strength, attack power, or defensive power of another character.

(Two-Dimensional Distribution of Environment Parameter)

Figure 3:
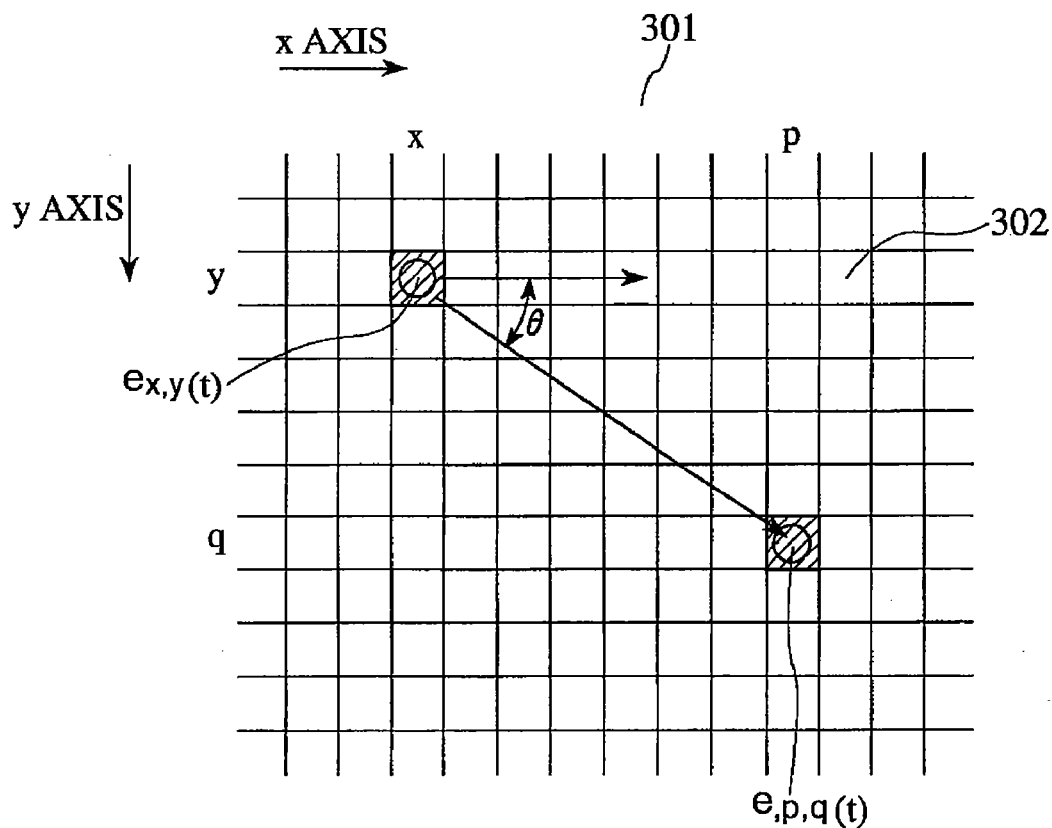
FIG. 3 is an explanatory diagram showing the environment parameter distribution information managed in the virtual world.

FIG. 3 is an explanatory diagram showing the environment parameter distribution information managed in the virtual world. A description is given below with reference to this drawing.

As shown in the figure, a ground 301 of the virtual world is marked by a grid 302 of two dimensions divided into an x-axis direction and a y-axis direction. Thus, typically a value $e_{i,j}$ of an environment parameter of the grid 302 of coordinates (p, q) is stored in an element e [p][q] of a two-dimensional array e[ ][ ].

Given that the position of the character on which the player is focused is located on the grid 302 of the coordinates (x, y), the direction toward certain coordinates (p, q) from the character (angle θ formed with axis x) can be obtained in such a manner that:

$\theta = \arctan [(q-y)/(p-x)]$; or $\cos \theta = (p-x)/[(p-x)^2 + (q-y)^2]^{1/2}$, $\sin \theta = (q-y)/[(p-x)^2 + (q-y)^2]^{1/2}$ Under such conditions, consider a technique wherein locations where an enemy character possibly exists are distributed two dimensionally as an environment parameter.

The simplest method is a technique wherein the value $e_{i,j}$ of the environment parameter is set to 1 when an enemy character exists at coordinates (i, j), and set to 0 in any other case.

Nevertheless, there are also cases where the location of an enemy character is preferably expressed with a certain margin of error, depending on the game. For example, consider a case where the stress level of an enemy character is expressed by vibration such as a pulse, and the stress level based on that pulse is propagated to the surrounding area and introduced in waves as atmosphere.

Under such conditions, a technique wherein, from the value $e_{i,j}$ (t), etc., of the environment parameter of the coordinates (i, j) at a time t, a recurrence formula for obtaining a value $e_{i,j}$ (t+1) of the environment parameter of the coordinates (i, j) at next time t+1 is used, may be employed.

The time unit of t is set to the interval (approximately 1/60 second) of a vertical synchronizing interrupt, which is a typical interval of a screen update of the information processing device 100.

That is, in a case where an enemy character k does not exist at coordinates (i, j) at time t+1, using propagation constants α and β where (0≦α, β, α+β≦1), then:

$$e_{ij}(t+1) = \alpha e_{i,j}(t) + (\beta/4)[e_{i-1,j}(t) + e_{i+1,j}(t) + e_{i,j-1}(t) + e_{i,j+1}(t)]$$

When the subscript e is out of the predetermined two-dimensional array range, the value is set to 0.

α is the ratio of environment parameters that do not leak out of the area, and β is the ratio of environment parameters that do leak out of the area. Typically, α>β. When α+β=1, a wave that occurs will remain until it leaves the area (until it is out of the two-dimensional array range). When α+β<1, the wave will gradually attenuate.

With the above recurrence formula, the values of the environment parameter of the current position and the positions above, below, and to the left and right thereof determine the value of the environment parameter of the current position of the next moment.

Additionally, a form where the direction of propagation is given a bias by changing the appropriate coefficient, or where propagation by a predetermined coefficient from a diagonal grid is also possible may also be employed. For example, using the propagation constants α, β, and γ where (0≦α, β, γ, α+β+γ≦1), then:

$$e_{ij}(t+1) = \alpha e_{i,j}(t) + (\beta/4)[e_{i-1,j}(t) + e_{i+1,j}(t) + e_{i,j-1}(t) + e_{i,j+1}(t)] +$$
$$(\gamma/4)[e_{i-1,j-1}(t) + e_{i-1,j+1}(t) + e_{i+1,j-1}(t) + e_{i+1,j+1}(t)]$$

Here, typically α>β>γ.

On the other hand, when the enemy character k exists at the coordinates (i, j) at time t+1, given a parameter $P_k$ of the stress level of the character k and a predetermined cycle time constant T, then:

$$e_{i,j}(t+1) = P_k[1+\sin((t+1)/T)]$$

Since the cycle of a person's pulse is approximately one pulse per second, given 60 as the value T, this parameter is related to the pulse of the enemy character. Further, by decreasing T to the extent that the stress level Pk increases, the level of stress can be more realistically expressed.

Additionally, a form where the above $P_k[1+\sin((t+1)/T)]$ is used in place of α $e_{i,j}$(t) is also possible. That is, in a case where the enemy character k exists at the coordinates (i, j) at time t+1, then conditions are such that:

$$e_{ij}(t+1) = P_k[1 + \sin((t+1)/T)] + (\beta/4)[e_{i-1,j}(t) + e_{i+1,j}(t) + e_{i,j-1}(t) + e_{i,j+1}(t)]$$

or:

$$e_{ij}(t+1) = P_k[1 + \sin((t+1)/T)] + (\beta/4)[e_{i-1,j}(t) + e_{i+1,j}(t) + e_{i,j-1}(t) + e_{i,j+1}(t)] +$$
$$(\gamma/4)[e_{i-1,j-1}(t) + e_{i-1,j+1}(t) + e_{i+1,j-1}(t) + e_{i+1,j+1}(t)]$$

Additionally, a value other than:

$$P_k[1+\sin((t+1)/T)]$$

may be used as a function for expressing vibration. That is, because the vibration function f (•) of cycle T satisfies the following with respect to an arbitrary t:

$$f(t+T)=f(t)$$

an arbitrary function that satisfies this condition may be used in place of the above function.

Furthermore, the initial value at time t=0 may be set to a predetermined constant such as 0 when there is no enemy character.

Such propagation of the environment parameter may be carried out for a reason other than the presence of an enemy character. For example, a parameter such as "an item that generates divine energy", "a machine that produces sound", "the bustling of a city", or "an odor" may be utilized as the environment parameter and as the generation source of "waves."

Furthermore, as described above, when the environment parameter is shown as a numeric value, various display methods may be employed without necessarily requiring expression as a "pulse" or "wave" during display, even when the environment parameter can be shown as a "pulse" or "wave." A specific example of such a display method will be described later.

(Observation Based on the Direction of the Environment Parameter)

When the two-dimensional distribution $e_{i,j}$(t) of an environment parameter at time t is obtained in this manner, a calculation for obtaining the environment parameter distribution $f_\theta$(t) based on a direction θ of the environment around the character located at position (x, y) is performed.

For example, consider a case of observing a radio source or gravitational source. In such a case, the value when an environment parameter $e_{p,q}$(t) of the coordinates (p, q) of a two-dimensional distribution is observed from the position (x, y) is inversely proportional to the square of the distance between the two. In a case of observing a sound wave or heat, a coefficient for attenuation thereof is further required.

In either case, a calculation such as that shown below is performed based on a function G (p, q, x, y) that attenuates as distance increases. The simulation performed, however, is in line with a physical phenomenon such as that described above. First, in a case where the value is inversely proportional to the square, given the following, the value may be used as the attenuation term:

$$G(p,q,x,y)=K/[(p-x)^2+(q-y)^2]$$

Additionally, an attenuation term such as the following may also be employed.

$$G(p,q,x,y)=K\exp(-[(p-x)^2+(q-y)^2]/L)$$

Based on this, the environment parameter distribution $f_\theta(t)$ of a case of observation related to a certain direction $\theta$ can be expressed, for example, as follows:

$$f_\theta(t)=\Sigma r=R^S G(x+r\cos\theta,y+r\sin\theta,x,y)e_{x+r\cos\theta,y+r\sin\theta}(t)$$

This is equivalent to the total amount that the environment parameter that exists from distance R to distance S was observed, as viewed from the position of the character. The distances R and S (R<S) can be suitably changed in accordance with the content of the game and the processing capacity of the information processing device 100. Further, the calculation of x+r cos θ and y+r sin θ may be suitably truncated or rounded up, or interpolation may be performed between neighboring grids.

(Setting the Reference Curve)

Figure 4:
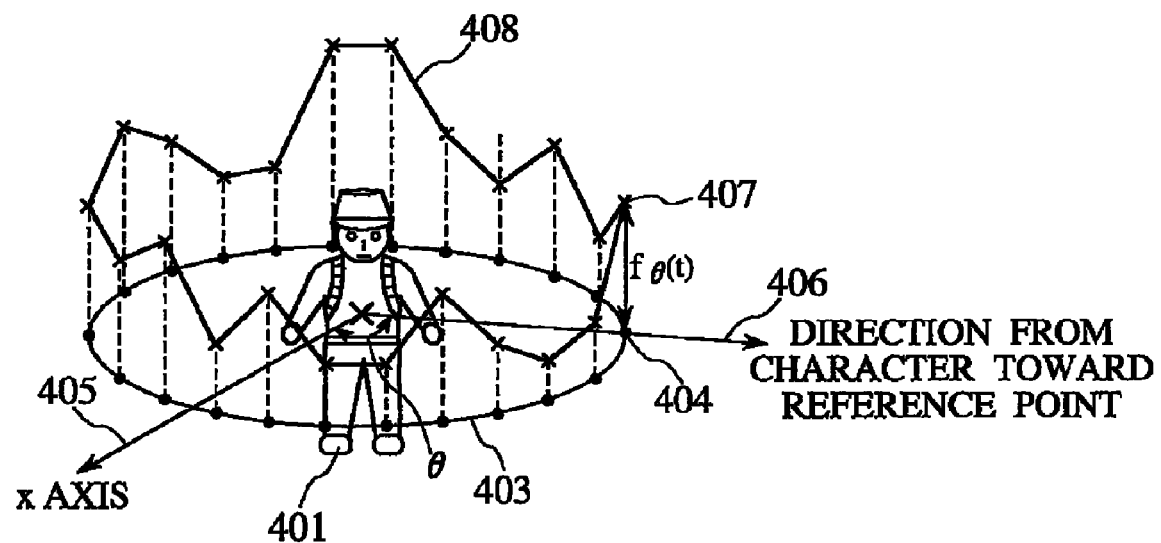
FIG. 4 is an explanatory diagram showing the positional relationship of a character and reference curve, etc.

The reference curve setting unit 203 sets a predetermined curve (hereinafter "reference curve") that surrounds the character. FIG. 4 is an explanatory diagram showing the positional relationship of a character and a reference curve, etc. A description is given below with reference to this drawing.

As shown in the figure, in this embodiment, a circle circumference 403 that is centered around a character 401 and is parallel to the ground, that is, orthogonal to the direction of the backbone of the character 401, is employed as the reference curve.

When the conditions of the virtual world are displayed on the screen, often the character 401 is shown from an obliquely downward view. In such a case, when the reference curve is temporarily projected on the screen, the reference curve takes on a cylindrical graphic shape.

Furthermore, when the posture of the character 401 changes with respect to the ground, or when the field of view is oblique (when the point of view of the virtual world or the position of the line of sight changes), the orientation of the circle circumference 403 may remain parallel to the ground as is, or may change in accordance with the posture of the character 401 or the slope of the field of view. Additionally, the angle formed by the line of sight and the circle circumference 403 of the reference curve may be set to a certain value so that the view from the point of view always appears at an angle.

Above the circle circumference 403, which is the reference curve, is disposed a reference point 404 that divides the circle circumference 403 at equal intervals. The number of reference points 404 may be suitably defined in accordance with factors such as the computing capacity of the information processing device 100 and the game content.

The position of the reference point 404 of the circle circumference 403 of the reference curve can be determined by the angle θ formed by a direction 405 of the x-axis set on the ground and a direction 406 of a half-line from the circle circumference 403 to the reference point 404 in FIG. 3.

At the reference point 404, the observed value $f_\theta(t)$ of the environment parameter is associated with the reference point 404 of the direction θ with respect to the character 401 at time t.

Then, in this embodiment, the position of a trajectory point 407 is determined based on the reference point 404 of the direction θ and the observed value $f_\theta(t)$ of the environment parameter.

That is, in this embodiment, the trajectory point setting unit 204 sets the trajectory point 407 corresponding to the reference point 404 of the direction θ in a position moved upward and displaced from the reference point 404 (perpendicular to the circle circumference 403) by the value $f_\theta(t)$. Thus, the position of the trajectory point 407 corresponding to each reference point 404 is obtained in this manner.

The trajectory point 407 is equivalent to the observed value of the environment parameter of each direction of the environment around the character 401 plotted on a cylinder of the environment around the character 401.

While in the above example adjustments are made so that the displacement of vibration does not become a negative value, thereby ensuring that the trajectory point 407 is never below the reference point 404, the present invention is not particularly limited to positive or negative vibration displacement since the height of the circle circumference 403 of the reference curve that includes the reference point 404 can be changed based on suitable settings.

Furthermore, while the reference points 404 are typically distributed so that the circumference circle is divided at equal intervals as described above, various techniques may be adopted, such as distributing the reference points 404 finely in the direction in which the observation point of the environment parameter changes abruptly, and roughly in any other direction.

(Image Creating)

The image creating unit 205 creates an image showing a trajectory curve 408 passing through the set trajectory point 407 and the character 401 viewed from the point of view placed in the virtual space.

When the trajectory curve 408 is drawn, the neighboring trajectory points 407 corresponding to the neighboring reference points 404 may be simply connected with line segments. A curve may also be smoothly drawn using a technique such as spline interpolation. In the example shown in FIG. 4, the trajectory curve 408 connects the neighboring trajectory points 407 with line segments.

Through use of a general three-dimensional graphic technique, the image creating unit 205 creates an image showing the virtual world from a predetermined point of view by perspective projection or parallel projection (equivalent to placing the point of view to a point at infinity by perspective projection).

Here, when the image in which the trajectory curve 408 is drawn is created, the curve object connecting the trajectory points 407 within the virtual space may be generated first and then displayed using three-dimensional graphics, or the coordinates of the trajectory points 407 may be converted to two-dimensional coordinates within the image by three-dimensional graphic processing and then the curve connecting these may be obtained by interpolation.

Figure 5:
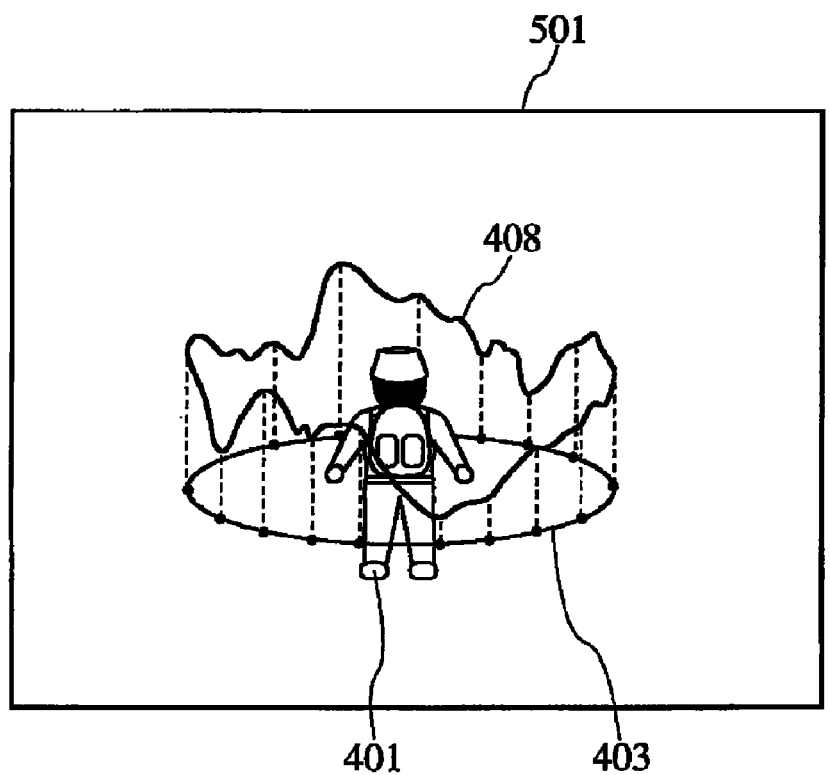
FIG. 5 is an explanatory diagram showing a created image.

FIG. 5 is an explanatory diagram showing the created image corresponding to the example of FIG. 4. As shown in the figure, in this embodiment, on a screen 501, the observed values of an environment parameter of this environment around the character 401 in focus are graphically displayed in three dimensions in the environment around the character by the trajectory curve 408. Further, in the figure, with the display of the circle circumference 403 of the reference curve, the difference between the circle circumference 403 and the trajectory curve 408 is presented in an easy-to-understand manner to the user.

As a result, the user can easily grasp the distribution of and change in the environment parameter in the environment around the character.

(Flow of Control)

Figure 6:
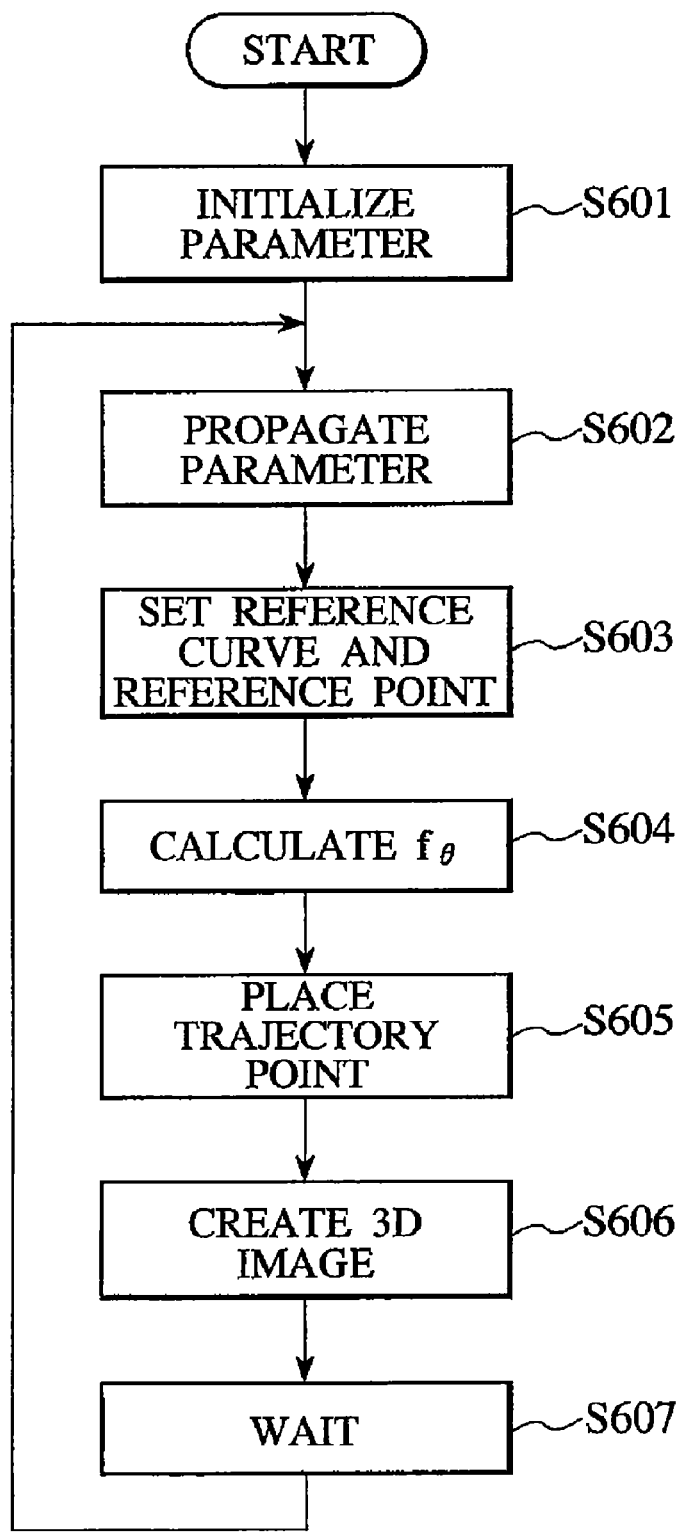
FIG. 6 is a flowchart showing the flow of control of the image creating process of the embodiment.

FIG. 6 is a flowchart showing the flow of control of the image creating process of this embodiment. While the details of each step of the image creating process is as described above, the processing procedure of each step will be further described with reference to this flowchart.

First, when the process is started, the CPU 101 clears the two-dimensional arrays maintained in the RAM 103, etc., to initialize the environment parameter (step S601), and subsequently performs the process of propagation of the environment parameter (step S602).

Next, the CPU 101 sets the circle circumference 403 and the reference point 404 of the reference curve based on the information of the character 401 placed within the virtual space (this information is also stored in the RAM 103, etc.) (step S603). Information on the shape, position, and form of the set circle circumference 403 and the reference point 404 is also stored in the RAM 103. Thus, the CPU 101 functions as the reference curve setting unit 203 with the RAM 103, etc.

Furthermore, for each set reference point 404, the CPU 101 calculates the observed value $f_\theta$ of the environment parameter of the direction $\theta$ of the reference point 404 viewed from the center of the circle circumference 403 (step S604), and places the trajectory point 407 in a position moved in a predetermined direction from the reference point 404 by the amount of move $f_\theta$ (step S605). The position information of the trajectory point 407 is also stored in the RAM 103. Thus, the CPU 101 functions as the parameter acquiring unit 202 and the trajectory point setting unit 204 with the RAM 103, etc.

Furthermore, the CPU 101 creates an image showing the character 401 and the trajectory curve 408 connecting the trajectory points 407 from the point of view placed in the virtual space using a three-dimensional graphic technique (step S606).

Thus, the CPU 101 functions as the image creating unit 205 with the image processor 107, the RAM 103, etc.

Furthermore, the created image is typically transferred to a frame buffer and updated and displayed on a display based on predetermined timing.

Then, the CPU 101 waits for a certain amount of time (until the next vertical synchronizing interrupt is generated) (step S607), and returns to step S602. Other processing can be executed as co-routines during standby. Conversely, a single unit of repetition of this process may be realized as a process within an interrupt handler of the vertical synchronizing interrupt.

According to this embodiment, an environment parameter of the environment around a character in focus is graphically displayed in three dimensions in the environment around the character 401 by the circle circumference 403 of the trajectory curve, etc., making it possible for the user to easily grasp the distribution of and change in the environment parameter in the environment around the character 401.

Embodiment 2

While the circle circumference 403 of a predetermined size and with the character 401 at its center is employed as the reference curve in the above embodiment, the present embodiment provides further information to the user, according to the size of the reference curve itself.

That is, in a game in which a character takes on another character (the other character being another player or the computer), the state of the other character can be observed according to the above invention, but it is also often desirable to identify how the player's own character looks from the other character.

Here, in this embodiment, an environment parameter of the position where the character exists (i.e., information corresponding to how the player's own character looks from the other character) is obtained using the same technique as that when obtaining an environment parameter of the environment around the character. That is, the parameter acquiring unit 202 further acquires an environment parameter of the position of the character.

The environment parameter itself of the position of the character 401 at time t can be acquired as $e_{x,y}(t)$. While this value may be used as is, in this embodiment, a value near the character 401 is utilized to acquire the environment parameter $f_0(t)$ of the position of the character 401.

For example, using a constant value D where $0<D<R$, and given:

$$f_0(t)=\Sigma_{m=-D}^{D-1}\Sigma_{n=-D}^{D-1}e_{x+m,y+n}/(4D^2)$$

then the average value of the environment parameter near D of the character 401 is $f_0(t)$. Additionally, similar to the above embodiment, a suitable attenuation coefficient, etc., may be adopted.

Then, the reference curve setting unit 203 sets the radius of the circle circumference 403 of the reference curve in accordance with the value of $f_0(t)$ acquired in this manner. While various techniques such as utilizing the value of $f_0(t)$ as is, adding a predetermined constant to the value of $f_0(t)$, or multiplying $f_0(t)$ by a predetermined constant are conceivable, typically a form in which the radius of the circle circumference 403 increases when $f_0(t)$ increases is utilized.

In this manner, the size of the reference curve is determined by an environment parameter near the character 401. While in the above embodiment the level of stress of the enemy character propagates like a pulse, in this embodiment, the level of stress of the player's own character is expressed by the frequency and level at which a graph increases and decreases like a pulse.

Figure 7:
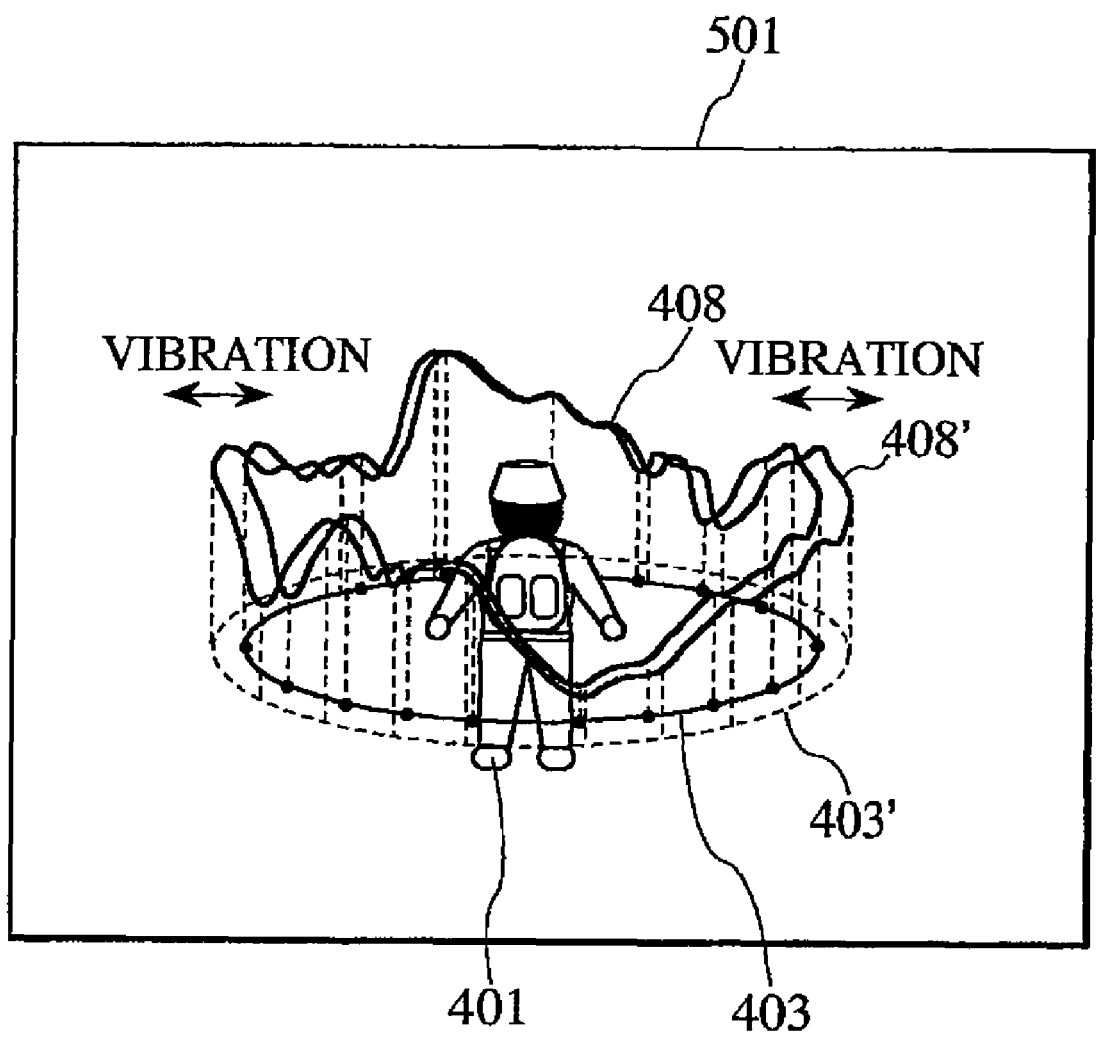
FIG. 7 is an explanatory diagram showing the size of the reference curve changing.

FIG. 7 is an explanatory diagram showing the change in the radius of the circle circumference 403 of the reference curve. A description is given below with reference to this drawing.

As described above, the radius of the circle circumference 403 changes according to time. Thus, at a certain moment, the circle circumference 403 and the trajectory curve 408 are drawn on the screen 501. Then, at a different moment, a circle circumference 403' and a trajectory curve 408' each having a slightly larger radius are drawn.

Then, according to the difference between the radii of the circle circumference 403 and the circle circumference 403' of the reference curve and the radii of the trajectory curve 408 and the trajectory curve 408' (i.e., according to the vibration width), and the frequency of the change (vibration) thereof, the level of stress of the player's own character can be identified.

According to this embodiment, it is possible to present to the user an environment parameter of the current position of a character by means of a graph prepared by the above-described invention without preparing a new meter or graph, thereby enabling the user to easily grasp the environment parameter of the current position of the character.

Embodiment 3

In the above embodiment, the circle circumference 403 is used as the reference curve, and the character 401 is placed at the center thereof. In the present embodiment, while the techniques for setting the circle circumference 403 of the reference curve and for creating the trajectory point 407 and the trajectory curve 408 are the same as those of the above embodiment, the user is provided with further information by shifting the relative positions thereof with respect to the character 401.

That is, the reference curve setting unit 203 changes the position of the circle circumference 403 of the reference curve with respect to the character 401 to a position associated with the speed and direction of movement of the character 401.

However, rather than changing the position of the circle circumference 403 of the reference curve itself, the coordinates of the positions of the trajectory point 407 and the trajectory curve 408 may first be determined as described above and then suitably moved.

Given the amount of movement (Δx, Δy) of these coordinates, the vector (u, v) of a parameter (such as speed or acceleration; various parameters may be utilized) of the movement of the character 401, the radius R of the circle circumference 403, and a predetermined constant H, various settings can be set, such as:

$$\Delta x = Hu, \Delta y = Hv; \quad (1)$$

$$\Delta x = (R - HR/(u+H))/\sqrt{2}, \Delta y = (R - HR/(v+H))/\sqrt{2} \quad (2)$$

Example (1) is preferred in a case where the upper limit of u, v is determined to a certain extent. The amount of movement in this case is determined in accordance with the size and sign of speed and acceleration. Example (2) is designed so that the size of the shift does not increase greater than the radius R of the circle circumference 403, regardless of the increase in size of u, v.

FIG. 8 is an explanatory diagram showing the shift of the reference curve and trajectory curve 408 with respect to the character 401 in such a case. A description is given below with reference to this drawing.

Figure 8A:
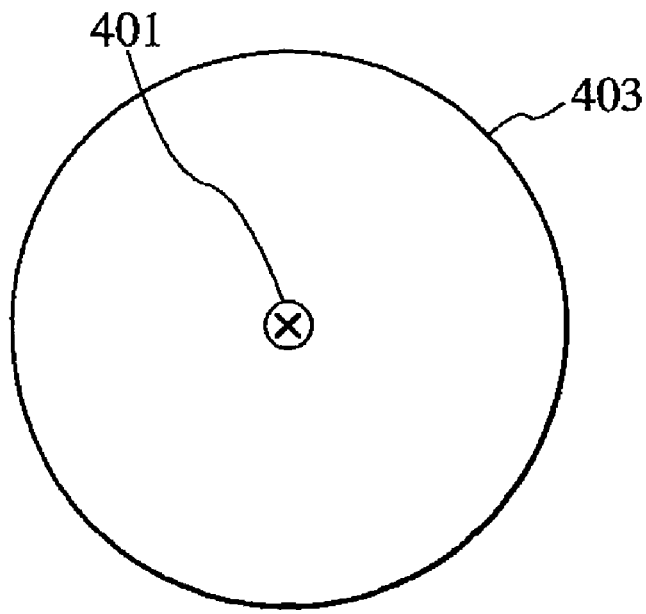
FIGS. 8A and 8B are explanatory diagrams showing the shift of the reference curve or trajectory curve with respect to the character.

FIG. 8A shows the positional relationship of the character 401 and the circle circumference 403 of the reference curve (trajectory curve 408) when the character 401 is not moving, as viewed from above the head of the character 401. The character 401 is placed at the center of the circle circumference 403.

Figure 8B:
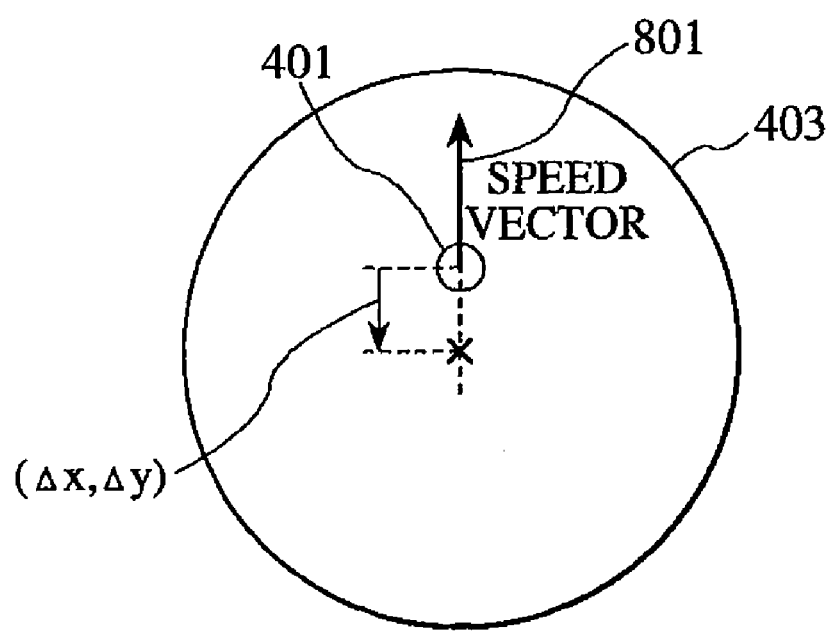

FIG. 8B shows a case where the character 401 is moving, as viewed from above the head of the character 401. A speed vector 801 of the movement of the character 401 is oriented upward in the FIG. 8B. Here, the circle circumference 403 of the reference curve is shifted in the direction opposite the speed vector 801. With this arrangement, the gap between the character 401 and the circle circumference 403 of the reference curve (the trajectory curve 408) becomes smaller in the direction in which the character 401 is moving. As a result, it is possible to give the player the impression that the trajectory curve 408 shifts in the direction opposite the direction of movement as a result of inertia and air resistance.

As described above, according to this embodiment, it is possible for the player to simply grasp an environment parameter of the environment around a character, and to simply grasp the speed and direction of movement of the player him/herself.

Embodiment 4

In the above embodiment, the circle circumference 403 is employed as the reference curve and, in the above example, the direction orthogonal to the plane that includes the circle circumference 403 is set as the "predetermined direction", resulting in conditions where the graph is drawn on the side surface of a column.

Nevertheless, generally, any direction having a component that is orthogonal to the plane that includes the circle circumference 403 may be set as the "predetermined direction".

FIG. 9 is explanatory diagram explaining the various ways of determining such a "predetermined direction". A description is given below with reference to this drawing.

Figure 9A:
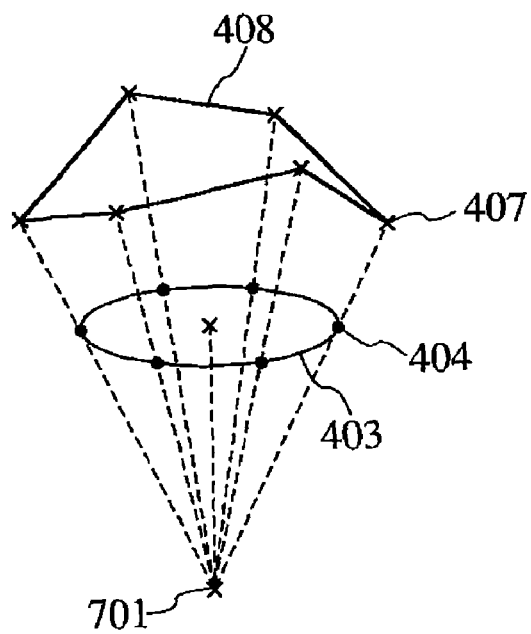
FIGS. 9A to 9C are explanatory diagrams explaining the various ways of determining the "predetermined direction."

In FIG. 9A, a predetermined convergence point 701 within the vertical line drawn from the center of the circle circumference 403 is provided and, for each reference point 404, the direction proceeding from the convergence point to the reference point 404 is set as the predetermined direction. Thus, the trajectory curve 408, coupled with the circle circumference 403, forms the shape of a crown.

Further, in the above embodiment, the position of the convergence point 701 may be shifted in the horizontal direction in the same manner in which the position of the circle circumference 403 is shifted according to the movement speed, etc., of the character 401. Such a state is shown in FIG. 9B.

Figure 9C:
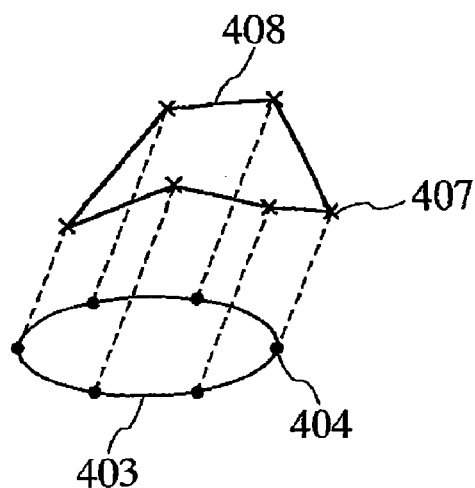
Figure 9B:
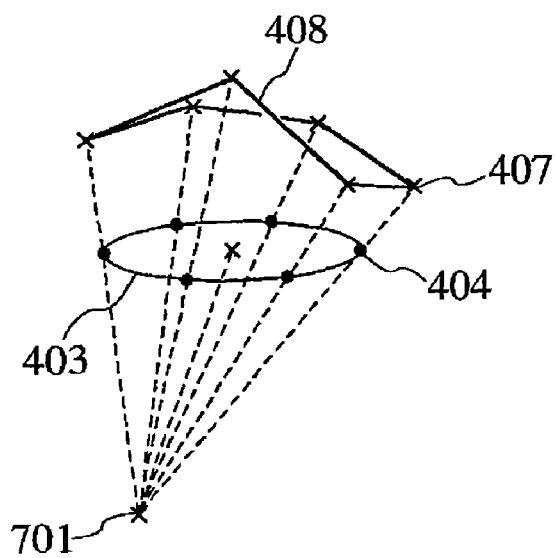

Additionally, as shown in FIG. 9C, a technique where the degree of the tilt of the column is shifted may also be utilized. Furthermore, the direction formed when the convergence point is moved to a point at infinity is a form of setting "the direction orthogonal to the plane that includes the circle" as the predetermined direction, as described above.

Additionally, a technique that sets the direction in which the angle formed with the line of sight is constant as the "predetermined direction" is also possible.

According to this embodiment, it is possible to configure in various manners the location in which a trajectory point is placed, and viewably present an environment parameter of the environment around the character to the user.

Embodiment 5

While in the above embodiments the distribution of an environment parameter of the environment around a character is expressed by directly drawing the trajectory curve 408, a technique wherein the distribution of the environment parameter is expressed by a graphic in which, for example, the trajectory curve 408 is established as an edge, that is, by a graphic in which the trajectory curve 408 is indirectly drawn is also possible.

Figure 10:
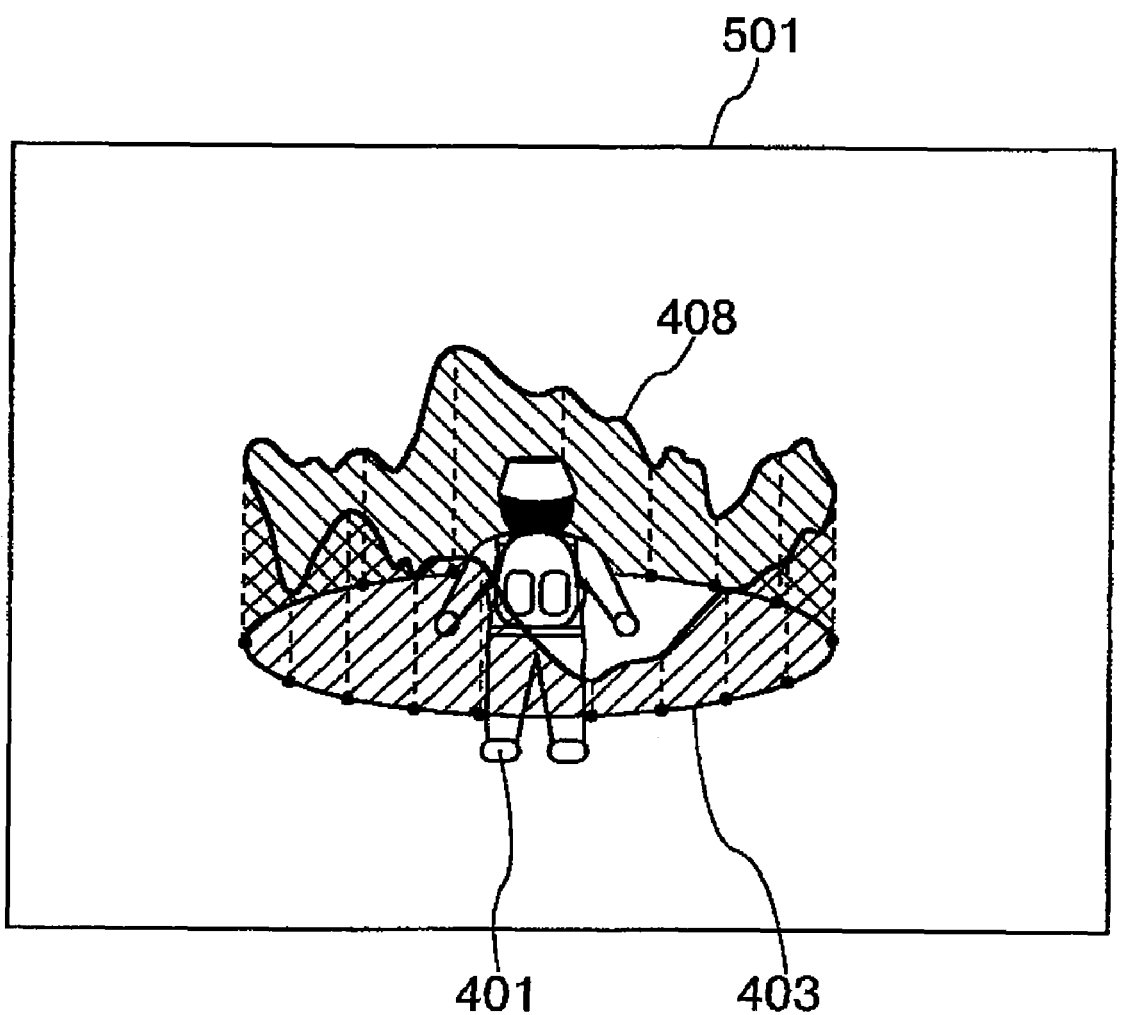
FIG. 10 is an explanatory diagram showing another trajectory curve display technique.

FIG. 10 is an explanatory diagram showing another display technique of the trajectory curve 408. A description is given below with reference to this drawing.

In the display example shown in this figure, for ease of understanding, the trajectory curve 408 and the reference curve 403 are drawn using distinct solid lines while the area between the two curves is shaded. When actually displayed on the screen, however, the shaded area is translucently drawn, and the trajectory curve 408 and the reference curve 403 are expressed as the edge of that translucent area, making it possible to not especially emphasize the display.

Utilizing such an expression enables presentation of the undulation of the distribution of an environment parameter of the environment around a character using a graphic, such as a mirage or an aurora, making it possible to not only capture the interest of the player but also provide an easy-to-understand graph display.

In this manner, whether the trajectory curve 408 should be expressed by adding color to the area, making the area translucent, painting out the area, or emphasizing the area by inversing the negative-positive sections of the background, for example, can be suitably selected according to the field of the game and the skill level of the player, etc.

Note that the present application claims priority based on Japanese Patent Application Number 2006-080401, the contents of which are incorporated herein by reference to the fullest extent permitted by the law of the designated country.

INDUSTRIAL APPLICABILITY

As described above, according to the present invention, it is possible to provide an image creating device and image creating method suitable for creating an image viewably showing the distribution of an environment parameter of the environment around a character in a virtual space, a computer readable information recording medium storing a program for realizing these on a computer, and the program.

The invention claimed is:

1. An image creating device comprising:
a parameter acquiring unit that acquires an environment parameter of the environment around a character placed in a virtual space, in each direction from the character;
a reference curve setting unit that sets a predetermined reference curve surrounding the character, the reference curve being centered around the character and being located within a plane, the reference curve including a predetermined number plurality of reference points;
a trajectory point setting unit that sets a trajectory point associated with each reference point in a position moved in a predetermined direction from the associated reference point in said set reference curve, the distance between each reference point and the associated trajectory point being a function of the value of said environment parameter at the respective reference point acquired in the direction from the character toward the reference point, the predetermined direction being perpendicular to the plane; and
an image creating unit that creates an image showing a trajectory curve, passing through said set trajectory points, and the character, the character and the curve being as viewed from the point of view placed in the virtual space.

2. The image creating device according to claim 1, wherein:
said parameter acquiring unit further acquires an environment parameter of the position of the character; and
said reference curve setting unit sets the size of the reference curve to a size associated with the value of said acquired environment parameter of the position of the character.

3. The image creating device according to claim 1, wherein:
said reference curve setting unit changes the position of the reference curve with respect to the character to a position associated with the speed and direction of movement of the character.

4. The image creating device according to claim 1, wherein:
the reference curve is a circle and the predetermined direction comprises a normal component with respect to the plane that includes the circle.

5. An image creating method comprising:
a parameter acquiring step of acquiring an environment parameter of the environment around a character placed in a virtual space, in each direction from the character;
a reference curve setting step of setting a reference predetermined curve surrounding the character, the reference curve being centered around the character and being located within a plane, the reference curve including a predetermined number of reference points;
a trajectory point setting step of setting a trajectory point associated with each reference point in a predetermined direction from the associated reference point in said set reference curve, the distance between each reference point and the associated trajectory point being a function of the value of said environment parameter at the respective reference point acquired in the direction from the character toward the reference point, the predetermined direction being perpendicular to the plane; and
an image creating step of creating an image showing a trajectory curve, passing through said set trajectory points, and the character, the curve and the character being as viewed from the point of view placed in the virtual space.

6. A computer-readable non-transitory information recording medium storing a program for controlling a computer to function as:
a parameter acquiring unit that acquires an environment parameter of the environment around a character placed in a virtual space, in each direction from the character;
a reference curve setting unit that sets a predetermined reference curve surrounding the character, the reference curve being centered around the character and being located within a plane, the reference curve including a predetermined number of reference points;
a trajectory point setting unit that sets a trajectory point associated with each reference point in a predetermined direction from each reference point in said set reference curve, the distance between each reference point and the associated trajectory point being a function of the value of said environment parameter at the respective reference point acquired in the direction from the character toward the reference point, the predetermined direction being perpendicular to the plane; and
an image creating unit that creates an image showing a trajectory curve, passing through said set trajectory points, and the character, the curve and the character being as viewed from the point of view placed in the virtual space.

7. An image creating device according to claim 1, the reference curve having an associated radius, the reference curve setting unit configured to change the radius of the reference curve over time.

8. An image creating device according to claim 7, the reference curve setting unit defining a frequency associated with the change in radius of the reference curve being a function of a stress related to the character.

9. An image creating device according to claim 1, the reference points being distributed uniformly about the reference curve.

10. An image creating device according to claim 1, the reference points being distributed along the reference curve as a function of the value of the environment parameter at each reference points.

11. An image creating device according to claim 10, the reference points being distributed more densely near abrupt changes in the environment parameter.

12. The image creating device according to claim 3, the change in the position of the reference curve being less than a radius of the reference curve.

13. The image creating device according to claim 3, the change in position of the reference curve being in a direction opposite the direction of movement of the character.

14. An image creating device comprising:
a parameter acquiring unit that acquires an environment parameter of the environment around a character placed in a virtual space, in each direction from the character;
a reference curve setting unit that sets a predetermined reference curve surrounding the character, the reference curve being centered around the character and being located within a plane, the reference curve including a predetermined number of reference points;

a trajectory point setting unit that sets a trajectory point associated with each reference point in a predetermined direction from the associated reference point in said set reference curve, the distance between each reference point and the associated trajectory point being a function of the value of said environment parameter at the respective reference point acquired in the direction from the character toward the reference point, each reference point having an associated trajectory direction, each trajectory point being set in the trajectory direction associated with the corresponding reference point from the corresponding reference point; and an image creating unit that creates an image showing a trajectory curve, passing through said set trajectory points, and the character, the character and the curve being as viewed from the point of view placed in the virtual space.

* * * * *